2 Sheets—Sheet 1.

M. FUOS.
Thrashing Machine.

No. 107,355. Patented Sept. 13, 1870.

Witnesses.

Inventor
Matthias Fuos

2 Sheets—Sheet 2.

M. FUOS.
Thrashing Machine.

No. 107,355. Patented Sept. 13, 1870.

Witnesses.

Inventor

United States Patent Office.

MATTHIAS FUOS, OF CASTROVILLE, TEXAS.

Letters Patent No. 107,355, dated September 13, 1870.

IMPROVEMENT IN THRASHING-MACHINES.

The Schedule referred to in these Letters Patent and making part of the same.

*To all whom it may concern:*

Be it known that I, MATTHIAS FUOS, of Castroville, in the county of Medina and State of Texas, have invented certain new and useful Improvements on Thrashing-Machinery; and I do hereby declare that the following is a full, clear, and exact description thereof, reference being had to the accompanying drawing making part of this specification, in which—

Figure 1:
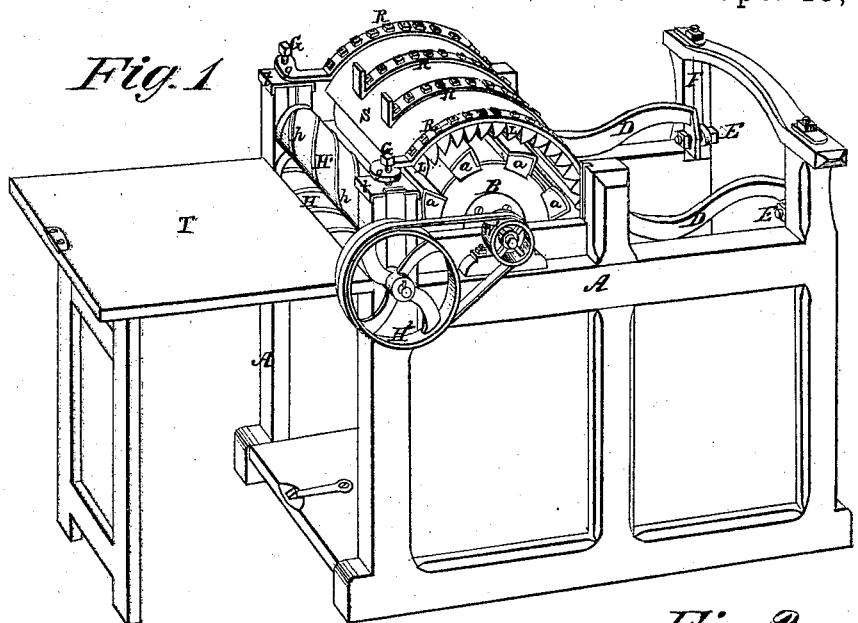

Figure 1, plate 1, is a perspective view of the improved machine, without the blast-chimney, and with a portion of one side of the frame removed to expose the thrashing-drum and concave.

Figure 2:
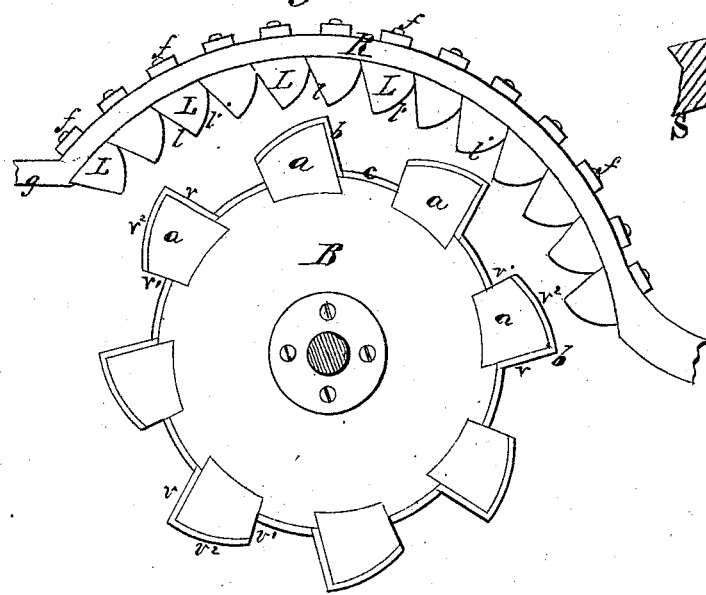

Figure 2, plate 1, are end views of the thrashing-drum and concave.

Figure 3:
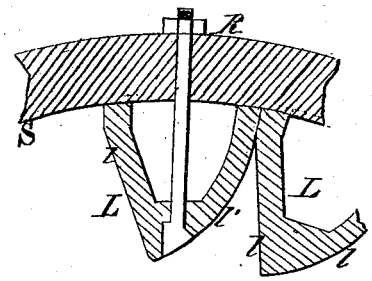

Figure 3, plate 1, is a sectional view, in detail, showing the mode of constructing the ribs and applying them to the concave.

Figure 4:
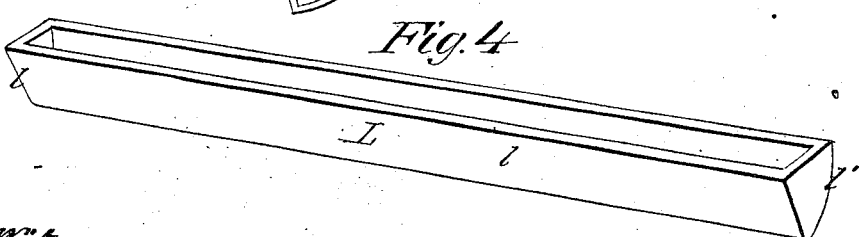

Figure 4, plate 1, is a perspective view of one of the ribs of the concave.

Figure 5:
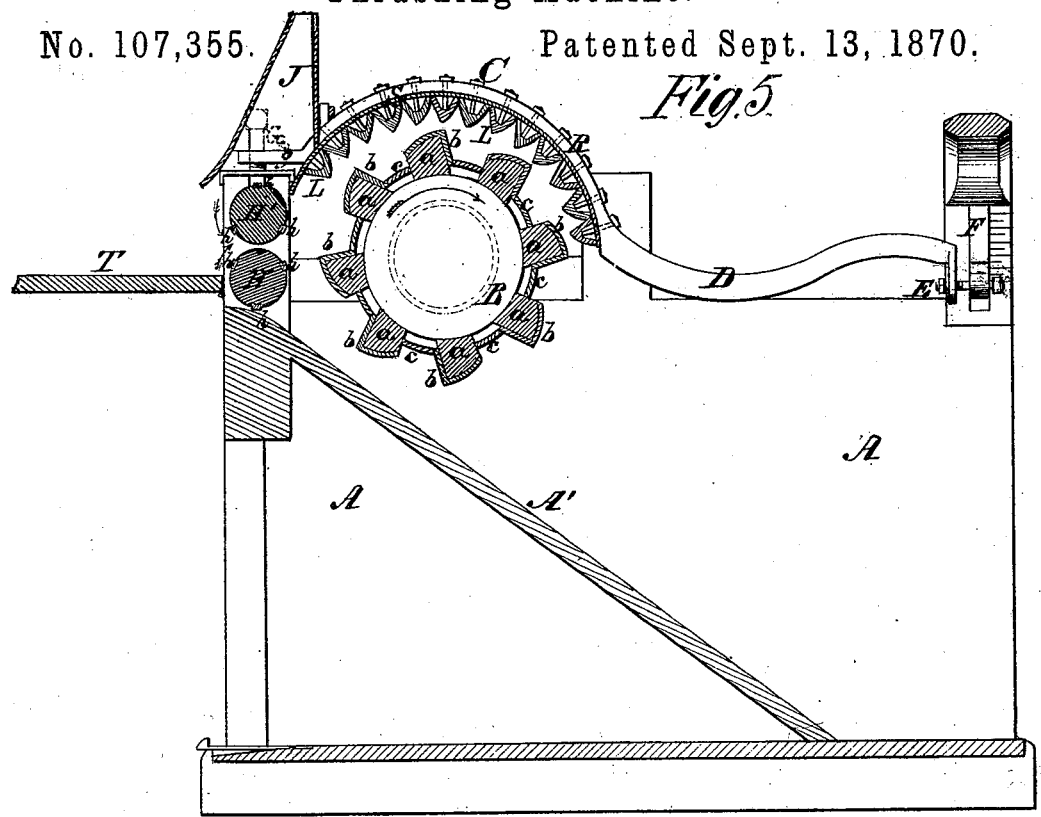

Figure 5, plate 2, is a section taken longitudinally and vertically through the center of the machine, with the blast-chimney attached.

Figure 6:
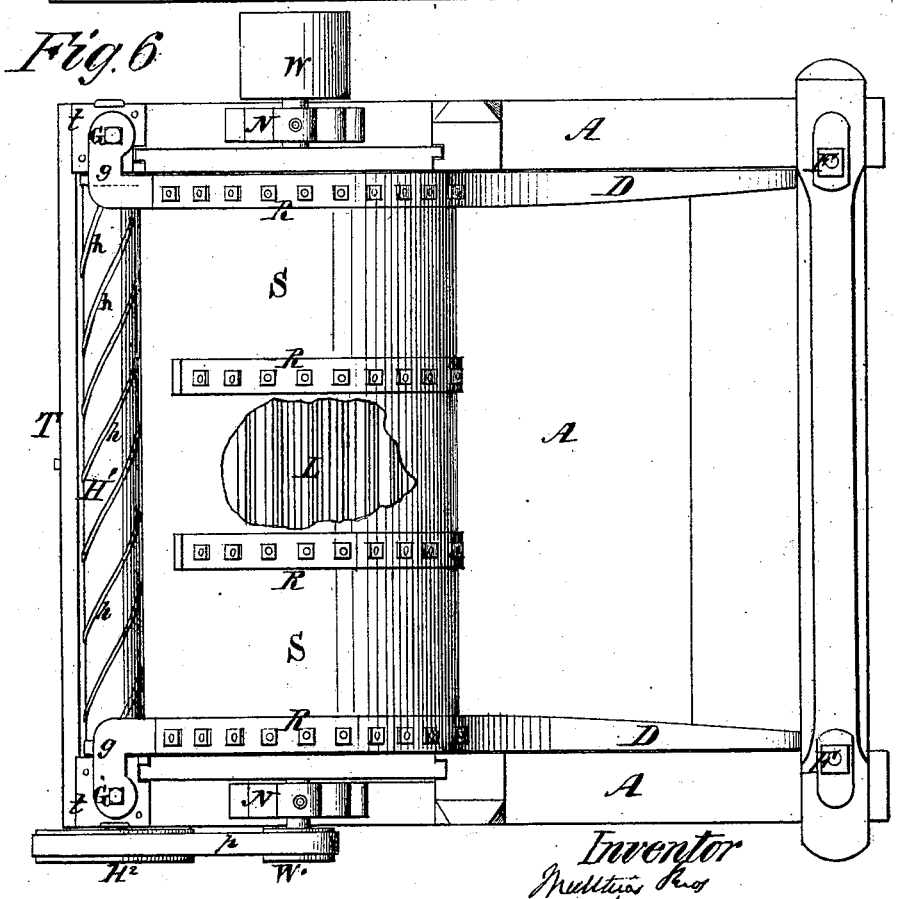

Figure 6, plate 2, is a top view of the machine, with blast-chimney detached, and a portion of the shell of the concave broken away to expose the backs of the ribs.

Similar letters of reference indicate corresponding parts in the several figures.

This invention relates to certain new and useful improvements on machinery for thrashing various kinds of grain, whereby the work is performed in a very rapid and perfect manner, and without impairing the straw.

The nature of my invention consists—

First, in a thrashing-drum, which is provided, on its outer surface, with separated ribs or thrashers, extending from end to end of the drum, so constructed that each rib will present to the material being thrashed an obtuse angular front surface and a receding curved or convex back surface, said drum being also constructed light near its center, and heavier at and near its circumference, for the purpose of causing it to rotate steadily, and with the greatest amount of momentum, as will be hereinafter explained.

Second, in the arrangement, above the rotary thrashing-drum, of a concave cap, which is provided with ribs, extending from one end to the other, and constructed with flat rectilinear thrashing sides and convex backs, and so arranged, with relation to the thrashing sides of the ribs on said drum, as to operate to the best advantage in thrashing grain, without injury to the straw, as will be hereinafter explained.

Third, in the construction of the concave cap of separate ribs, arranged together in parallel lines and securely confined to braces applied upon a sheet-metal backing, and in making the ribs with grooved or hollow backs, whereby lightness and strength are obtained, as will be hereinafter explained.

Fourth, in the construction of feed-rollers with bands applied spirally to their peripheries, in such manner as to afford a uniform feed across the entire width of the machine.

To enable others skilled in the art to understand my invention, I will describe its construction and operation.

In the accompanying drawing—

A represents a frame, which is adapted for supporting the several devices constituting the improved machine.

At one end of this frame, and sustained by suitable journal-boxes, N N, is the thrashing-drum B, on the ends of the journals of which belt-wheels W W$^1$ are keyed, as shown in fig. 5.

The belt-wheel W receives the driving-belt, and the belt-wheel W$^1$ communicates motion to a wheel, H$^2$, on one end of a feed-roller, H, through the medium of a belt, $p$.

The feed-roller H is arranged in a horizontal plane parallel to the axis of the thrashing-drum, and in front of this drum, and above this roller, is another feed-roller, H$^1$, between which two rollers the material to be thrashed is conducted on its way from the table T to the thrashing devices.

Above the thrashing-drum is arranged the concave cap C, having ribs or shoulders on its under surface, which operate in conjunction with the shouldered ribs on the drum, for thrashing the grain from the straw.

Beneath the thrashing-drum B is an inclined plane, A', on which the thrashed material falls, and from which this product escapes out of the machine.

The drum B is made hollow, and constructed interiorly in any suitable manner, so as to obtain the required degree of strength and lightness. This drum is made comparatively light at and near its center, and heavier at and near its circumference, so as to obtain the required degree of momentum to afford a steady and regular motion.

This effect is augmented by the addition of metal face-plates to the periphery of the drum and to the front and convex surfaces of the ribs $a$, which are secured to the heads of the drum in a substantial manner, and are arranged, at regular intervals apart, around this drum, extending from one end to the other, parallel to its axis.

Each rib, $a$, is faced by a steel plate, $b$, which covers its front and convex sides, and affords durability and smoothness to these surfaces.

The circumference of the drum between the ribs is also covered by thin plates, $c$, which may be of sheet metal.

In cross-section the acting surface $v$ (see fig. 2) of each rib $a$ is in a plane, forming an obtuse angle to the periphery of the drum, or, in other words, the plane of the face $v$ is tangent to the circumference of a circle described within the drum B, and concentric therewith.

The outer surface, $v^2$, of each rib $a$ is convex, and inclined backward, as shown in fig. 2, so that the rear shoulder, $v^1$, is much shorter than the front surface $b$.

It will be seen, from the above description, that the drum presents, alternately, a rib, and a space between the ribs, which, together with the peculiar shape of the ribs, offers the most advantageous form of thrashing surfaces.

The concave cap consists, essentially, of three parts, to wit: the cast-iron ribs L, the sheet-metal backing S, and the wrought-iron braces or straps R.

The ribs L are arranged beneath the backing and straps, and are secured to the latter by means of bolts and nuts $f$.

Each rib L is made with a flat surface, $l$, and a convex surface, $l'$. The flat surface $l$ of each rib has a deviation from an obtuse angle of about four inches from the axis of the drum B, thereby forming an oblique shoulder, which terminates inwardly in an acute or rounded angle, as clearly shown in figs. 2 and 3. Each rib is also channeled or hollowed out on its back side, so as to afford lightness and strength.

The rear portions of the straps R R, nearest the extremities of the concave cap C, terminate in arms D D, and the front ends of said straps R R terminate in short arms $g$ $g$.

The longer arms, D, have their rear ends turned downwardly, and perforated, and through these portions screws, E, pass.

These screws work in nuts on the lower ends of the rods F, at the rear of the frame A, and, to these screws, the arms D are secured by shoulders and nuts, or in any other suitable manner. This attachment of the arms D to the rods F will admit the forward or backward adjustment of the concave cap by turning the screws E.

The rods F depend from a cross-bar of frame A, and are held by nuts, by adjusting which the arms D and their end of the concave can be adjusted vertically.

The shortest arms, $g$ $g$, receive screws, G G, through them, which are stepped on the removable post-caps $t$ $t$, so as to sustain the concave on these caps. Thus it will be seen that the concave cap C rests, by its own gravity, upon the front posts of the frame A at one side, and that it is sustained at the opposite side by the arms D, screws E, and rods F.

The two feed-rollers H H¹, between which the material is fed to the thrashing devices from the table T, have their end bearings in the front posts of the frame A.

The lower feed-roller, H, has its end bearings in journal-blocks, fitted into vertical recesses made into the upper ends of the front posts of the frame A, and the upper feed-roller, H¹, has its end bearings in perforated tubes or cylinders, which rest on the boxes of the lower roller, H. By this arrangement the upper roller, H¹, is free to rise and descend while it is being turned by the lower feed-roller, acting through tubes or cylinders which rest on the boxes of the lower roller, H. By this arrangement the upper roller, H¹, is free to rise and descend while it is being turned by the lower feed-roller, acting through the medium of the material which is being moved between the rollers.

Each feed-roller has two, three, or more, narrow bands, $h$, (preferably made of steel,) wound spirally around it, extending from one end to the other of the roller, and rising from its surface a short distance.

The bands $h$ of the upper roller are wound around it in a direction opposite to that of the lower roller, so that the two sets of bands meet each other, when in operation, with a drawing movement, like the blades of a pair of common scissors. These rollers, with their spiral bands, will feed the material to be thrashed between the drum and its concave in a very uniform manner, and enable a person having very little experience with the machine to feed it successfully.

The front ends of the two intermediate straps R R of the concave cap C are turned upward, and thus adapted to receive staples on the back of a chimney, J, and to support such chimney in the position indicated in fig. 5. The chimney J will carry off the dust and other light particles which escape from beneath the front of the concave cap, and thereby, in a great measure, protect the person stationed at the feed-table T.

I am aware that, in the year 1834, Sylvanus Leonard obtained Letters Patent of the United States for a thrashing-machine, in which he employed a rotary thrasher, having long beveled teeth or serrations formed on its periphery, and extended from end to end of it, and I do not claim such a contrivance as my invention.

I am also aware that Nelson Palmer obtained Letters Patent on a thrasher, wherein he employed a yielding concave which would, in a measure, accommodate itself to the varying amount of material passed between it and the thrashing-drum. I do not, therefore, claim such a concave as is shown by Nelson Palmer.

Having described my invention,

What I claim as new, and desire to secure by Letters Patent, is—

1. The thrashing-machine cylinder herein shown, composed of the ribs $a$, metal sheathing $b$ $c$, and wood supports B B, the said ribs of the cylinder, with the metal sheathing, being shaped as shown at $c$ $b$, $v$ $v^1$ $v^2$, and applied as represented, all for the purpose set forth.

2. A thrashing-cylinder, having its ribs and sheathing constructed as shown and described, in combination with the concave cap C, provided with ribs L $l$ $l'$, constructed as described, all for the purpose set forth.

3. The ribs L of the concave, constructed as described, and applied as set forth.

4. The ribs L of the concave, when made with an oblique but straight side, $l$, and a convex side, $l'$, as shown and described.

5. The combination, with the concave cap C, made adjustable, as described, of the ribs L, constructed respectively as described.

6. The combination of the spirally-ribbed feed-roller H H¹ $h$ $h$, ribbed thrashing-cylinder B, ribbed concave C, and spout J, all arranged and operating in the manner herein described.

MATTHIAS FUOS.

Witnesses:
WM. STRICKLER,
JOS. KEMPF.